US012418974B2

(12) United States Patent
Wandke et al.

(10) Patent No.: US 12,418,974 B2
(45) Date of Patent: Sep. 16, 2025

(54) TREATMENT ASSEMBLY FOR TREATING THE SURFACE OF A BODY WITH A DIELECTRICALLY LIMITED PLASMA

(71) Applicant: CINOGY GMBH, Duderstadt (DE)

(72) Inventors: Dirk Wandke, Heiligenstadt (DE); Mirko Hahnl, Berlingerode (DE); Karl-Otto Storck, Duderstadt (DE); Leonhard Trutwig, Duderstadt/Gerblingerode (DE); Melanie Ricke, Katgerode (DE); Jan-Hendrick Hellmond, Duderstadt (DE)

(73) Assignee: CINOGY GMBH, Duderstadt (DE)

( * ) Notice: Subject to any disclaimer, the term of this patent is extended or adjusted under 35 U.S.C. 154(b) by 910 days.

(21) Appl. No.: 17/604,231

(22) PCT Filed: Apr. 14, 2020

(86) PCT No.: PCT/EP2020/060447
§ 371 (c)(1),
(2) Date: Oct. 15, 2021

(87) PCT Pub. No.: WO2020/212338
PCT Pub. Date: Oct. 22, 2020

(65) Prior Publication Data

US 2022/0304132 A1 Sep. 22, 2022

(30) Foreign Application Priority Data

Apr. 15, 2019 (DE) ..................... 10 2019 109 940.4

(51) Int. Cl.
*H05H 1/24* (2006.01)
*H01R 13/24* (2006.01)

(52) U.S. Cl.
CPC ........... *H05H 1/2418* (2021.05); *H01R 13/24* (2013.01); *H05H 1/2406* (2013.01); *H05H 2245/30* (2021.05)

(58) Field of Classification Search
CPC ......... H05H 1/2406; H05H 2001/2418; H05H 2001/2412; H05H 2245/122;
(Continued)

(56) References Cited

U.S. PATENT DOCUMENTS 4,577,643 A 3/1986 Beranek
6,958,670 B2 10/2005 Winslow et al.
(Continued)

FOREIGN PATENT DOCUMENTS

CN 106687147 A 5/2017
CN 107535042 A 1/2018
(Continued)

*Primary Examiner* — Yuechuan Yu
(74) *Attorney, Agent, or Firm* — WCF IP

(57) ABSTRACT

The invention relates to a treatment assembly for treating the surface of a body with a dielectrically limited plasma, comprising an electrode assembly (1), in which at least one electrode (1*a*, 1*b*) is arranged in a base section of the electrode assembly (1), which is completely shielded from the surface to be treated by a dielectricum (3), and a connection conductor (6*a*, 6*b*) of which extends into a contact projection (5) of the dielectricum (3). The treatment assembly also comprises a contact element (2, 2'), which has a receiving opening (18, 18) for the contact projection (5) and a lever assembly for opening and closing the receiving opening (18, 18') and for pressing a contact pin (31) through a prefabricated recess (14) of the dielectricum (3) onto the electrode (1*a*, 1*b*) in order to deliver a connection of a high-voltage AC source to the electrode (1*a*, 1*b*), allows a spatially close arrangement of two contact pins (31), which are connected to at least one high-voltage source, in close proximity to each other in that the electrode assembly (1) has
(Continued)

Figure 1A:
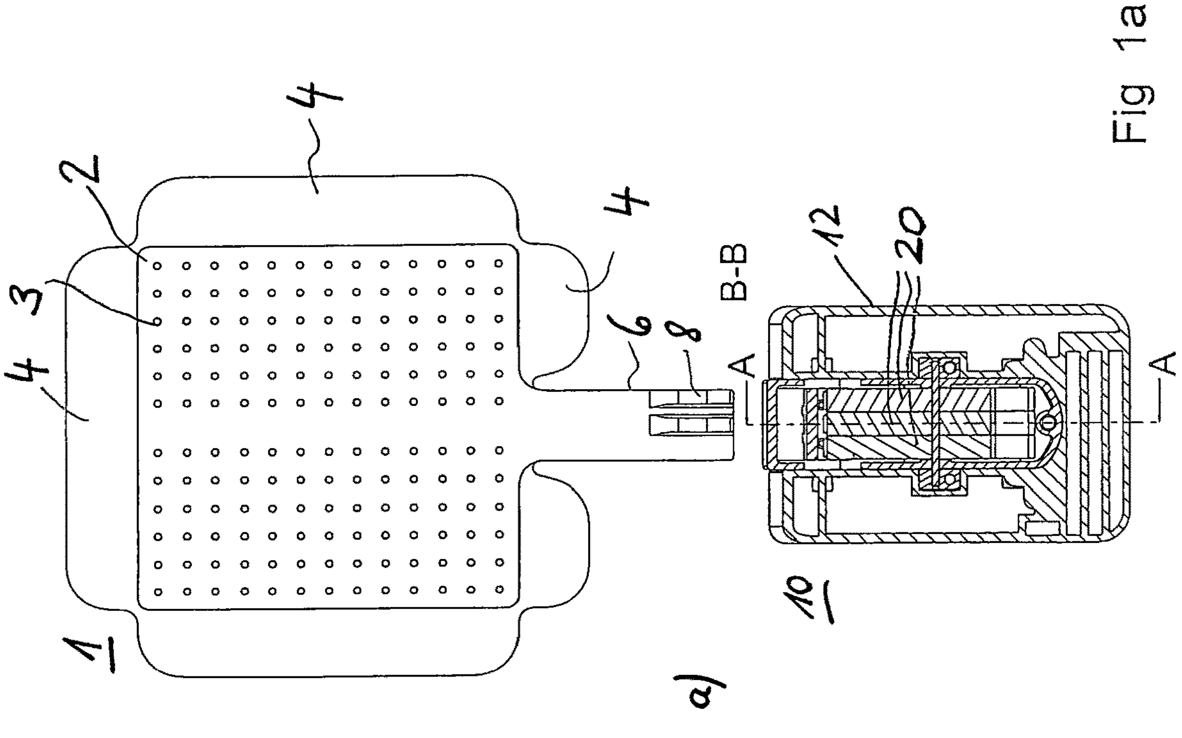

at least two electrodes (1*a*, 1*b*), which are arranged in the base section and are insulated from each other by the dielectricum (3) and a connection conductor (6*a*, 6*b*) of each of which extends into the contact projection (5); a recess (14) is provided in the dielectricum (3) and a contact pin (31) is provided for each connection conductor (6*a*, 6*b*); at least one of the contact pins (31) is supported in the contacting element (2) by means of a dielectric casing (30) and is designed with a non-insulated end face (46) for producing a contact with the corresponding electrode (1*a*, 1*b*); and the at least one dielectric casing (30) is oversized with respect to the corresponding recess (14) in the dielectricum (3), said oversize allowing a press fit of the casing (30) in the dielectricum (3) by means of the lever assembly when the non-insulated end face (46) of the contact pin (31) contacts the corresponding electrode (1*a*, 1*b*), wherein the press fit prevents an air gap.

12 Claims, 12 Drawing Sheets

(58) Field of Classification Search
CPC ............ H05H 1/2418; H05H 2242/00; H05H 2245/34; H05H 2245/30; A61L 2/0011; A61L 2/14; A61N 1/04; H01R 13/24; H01R 13/62933; H01R 12/774; H01R 12/88
See application file for complete search history.

(56) References Cited

U.S. PATENT DOCUMENTS

| | | | |
|---|---|---|---|
| 10,357,580 B2 | 7/2019 | Trutwig et al. | |
| 11,102,879 B2 | 8/2021 | Olivadese et al. | |
| 2010/0057249 A1* | 3/2010 | Abe | H01L 21/67781 700/230 |
| 2017/0231680 A1* | 8/2017 | Mahrenholz | A61N 1/44 606/34 |
| 2018/0221517 A1* | 8/2018 | Trutwig | A61B 18/042 |
| 2020/0170098 A1 | 5/2020 | Wandke et al. | |
| 2020/0405291 A1* | 12/2020 | Shelton, IV | A61B 50/20 |

FOREIGN PATENT DOCUMENTS

| | | | |
|---|---|---|---|
| CN | 111096081 | A | 5/2020 |
| DE | 102011105713 | A1 | 12/2012 |
| DE | 102014013716 | A1 | 3/2016 |
| DE | 102014220488 | A1 | 4/2016 |
| DE | 102015101391 | A1 | 8/2016 |
| DE | 102017116305 | A1 | 1/2019 |
| EP | 0114919 | A1 | 8/1984 |
| JP | H5299142 | A | 4/1992 |
| JP | H05299142 | A | 11/1993 |
| JP | 2003179127 | A * | 6/2003 |
| JP | 2014222608 | A | 11/2014 |
| WO | 2019/015717 | A1 | 1/2019 |

* cited by examiner

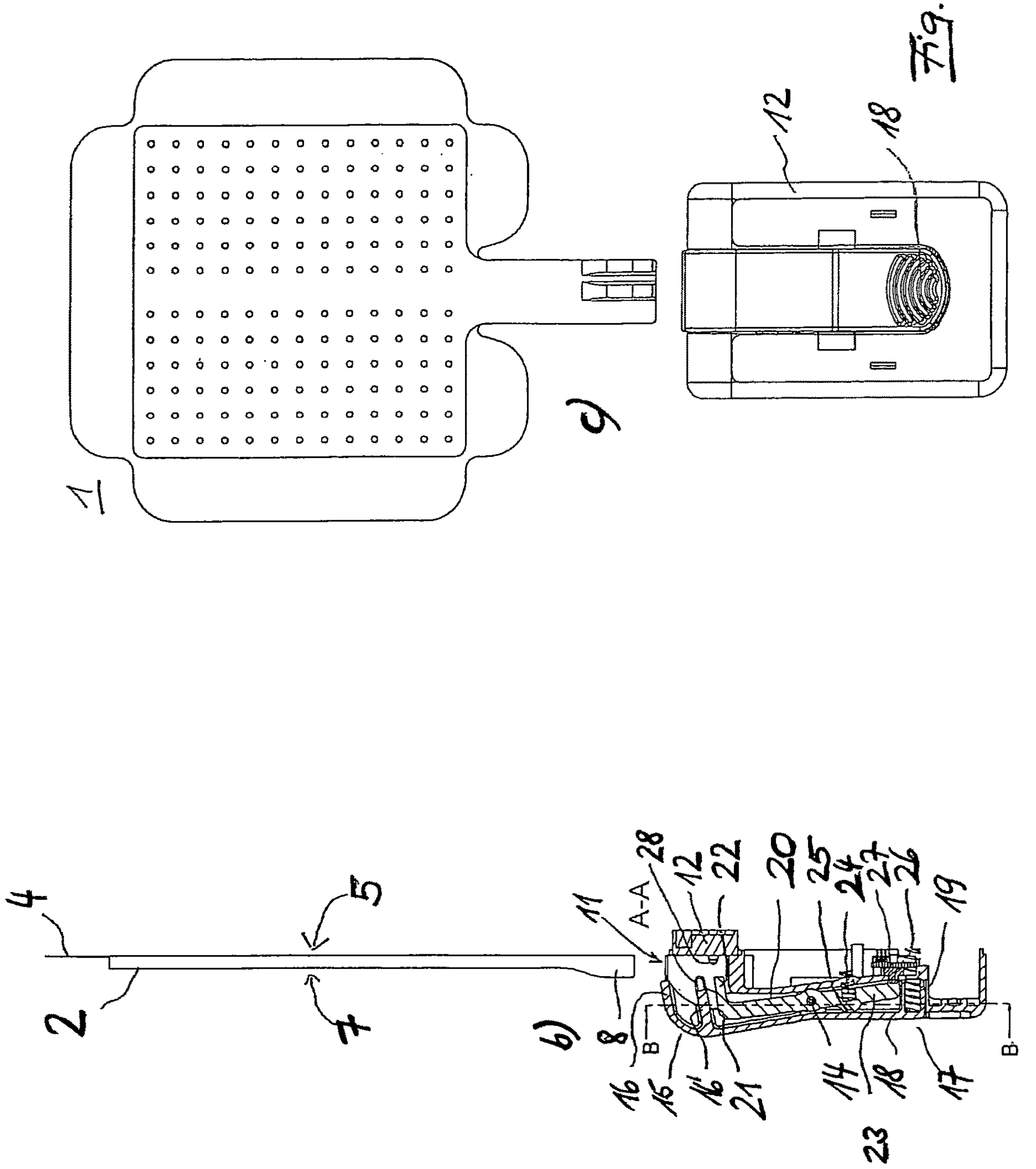
Fig. 1b, c 18
c)
A-A
24
B
B
21
13
20
25
12
19
b)
B-B
A
A
25
19
a)

TREATMENT ASSEMBLY FOR TREATING THE SURFACE OF A BODY WITH A DIELECTRICALLY LIMITED PLASMA

The invention relates to a treatment arrangement for the treatment of a surface of a body with a dielectric barrier plasma, having an electrode arrangement in which at least one electrode is disposed in a base section of the electrode arrangement, is fully shielded with respect to the surface to be treated by a dielectric, and extends by a terminal conductor into a contacting projection of the dielectric, and having a contacting element having a receiving opening for the contacting projection and a lever arrangement for opening and closing the receiving opening and for contact pressure on a contact pin through a prefabricated recess in the dielectric onto the electrode for guiding a terminal of a high-voltage AC source onto the electrode.

It has long been known that dielectric barrier plasma discharge of a surface of a body can have a positive influence on the surface. For instance, surfaces made of a wide variety of different materials can be disinfected and/or prepared for acceptance of adhesives, paints or the like by means of a low-temperature plasma discharge, like a dielectric barrier plasma discharge. Also known is the treatment of surfaces of the skin of living bodies with a dielectric barrier plasma discharge, which can achieve either disinfection or an increase in microcirculation in the skin, and hence also improved wound healing.

For the generation of a dielectric barrier plasma, the electrode of the treatment arrangement is supplied with high-voltage AC. While the electrode arrangement was first connected via a suitable high-voltage cable to a treatment device in which the high-voltage AC was generated, an idea that has increasingly been pursued is that of designing such an electrode arrangement in readily exchangeable form, so that, especially for the treatment of surfaces of the skin, it was possible after a treatment to replace the used electrode arrangement rapidly and easily with a new, sterile-packed electrode arrangement.

Such a treatment arrangement having the features mentioned at the outset is known, for example, from DE 10 2014 013 716 A1. The dielectric of the electrode arrangement has a contacting projection into which the electrode extends by a terminal conductor. In the contacting projection, the dielectric is provided with a recess through which a small surface area of the terminal conductor is exposed as the base of the recess. In use, a contacting pin of the contacting element projects into the recess and contacts the exposed surface of the terminal conductor at the end face, by means of which the high-voltage AC is fed in via the contact pin. The contacting element encloses the arrangement composed of contact pin and recess in the dielectric with an insulating housing, the receiving opening of which for the contacting element can be closed with the lever arrangement, such that contact safety with respect to the high-voltage supply is assured.

EP 3 320 759 B1 discloses an electrode arrangement in which two electrodes are arranged alongside one another in the base section. The two electrodes are fully embedded into the dielectric and hence also insulated from one another by the dielectric. While it is known that two electrodes in an electric arrangement can be connected to the different terminals of a high-voltage AC source, such that one of the electrodes receives the high-voltage phase and the other electrode is at ground potential, EP 3 320 759 B1 envisages supplying both electrodes with the mirror-image phases of the AC voltage source. This achieves the effect that, in the vicinity of the electrodes, twice the amplitude of the high-voltage AC signals arises, whereas the excitation fields are eliminated within a short distance from the electrodes, such that there is a considerable reduction in electromagnetic fields that disrupt the environment. In order not to allow the contacting element to become too large, it is envisaged that the terminal conductors of the two electrodes be allowed to run parallel to one another in the very narrow contacting projection, and that they be contacted there with contact pins of the contacting element. However, the result of this is that the contacting pins must be arranged close to one another. However, voltage amplitudes of 20 kV, for example, that are used here require a minimum distance from one another that is a function of the length of the distance through the air between the contact pins or the terminal conductors that is required for prevention of sparkover. This distance can be observed when the dielectric has one contacting projection for each electrode that extend from the base section of the electrode arrangement in different directions. However, this necessitates the use of two contacting elements that in practice lead to doubling of the complexity.

The objective underlying the invention is thus that of designing a treatment arrangement of the type mentioned at the outset with at least two electrodes in the electrode arrangement such that they can be contacted with a minimum level of complexity.

For achievement of this object, a treatment arrangement of the type mentioned at the outset is characterized in that that the electrode arrangement has at least two electrodes that are disposed in the base section and are isolated from one another by the dielectric and each extend by a terminal conductor into the contacting projection, in that there is one recess in the dielectric and one contact pin for each terminal conductor, in that at least one of the contact pins in the contacting element is coated with a dielectric sheath and is designed with a non-insulated end face for establishing contact with the corresponding electrode and in that the at least one dielectric sheath is oversized with respect to the corresponding recess in the dielectric, by virtue of which the sheath, by means of the lever arrangement, is press-fitted into the dielectric so as to avoid an air gap when the non-insulated end face of the contact pin contacts the corresponding electrode.

The design of the invention ensures that the contact pin with its dielectric sheath rests in the dielectric without an air gap, such that there is no direct pathway through the air between the contact pins for the at least two electrodes or the at least two electrodes themselves. Instead, the relevant minimum distance is determined to a crucial degree by the dielectric properties of the dielectric and of the dielectric sheath.

The invention is employable when the at least two electrodes are connected to an AC voltage source in a conventional manner, i.e. one electrode to an AC voltage phase and the other electrode to ground. In that case, it is not absolutely necessary to provide the contact pin connected to the ground connection of the high-voltage source with a dielectric sheath. It will be appreciated that flashover security is increased when this contact pin too, in the inventive manner, is provided a dielectric sheath that is oversized relative to the corresponding recess in the dielectric.

The present invention is particularly appropriate in the case in which the electrode arrangement has two electrodes that are connected to opposite phases of an AC voltage. In this case, owing to the doubling of the maximum potential difference, it is particularly necessary to provide both contact pins with the dielectric sheath of the invention in order to embed the contact pins into the dielectric effectively without an air gap when the connection with the corresponding electrodes is established via the end faces of the contact pins.

In one modification of the described embodiment with two electrodes driven in antiphase, it is also possible to provide a ground electrode as third electrode in the electrode arrangement. It may be appropriate here to arrange the ground electrode, with respect to the two electrodes driven in antiphase, in a different position in a multilayer structure of the electrode arrangement, such that the ground electrode comes to rest in the dielectric between the electrodes driven in antiphase and the surface to be treated. It will be appreciated that the ground electrode is insulated with respect to the antiphase electrodes by the dielectric. The ground electrode here has apertures that enable the formation of what is called a surface plasma on account of the excitation field that extends through the openings in the ground electrode.

For the present invention, however, preference is given to the design with two electrodes driven in antiphase, for which the surface to be treated or the corresponding body form a counterelectrode. For this purpose, the body may be grounded by a ground connection. In general, it is sufficient when the body, on account of its mass, constitutes a "floating" ground electrode/counterelectrode.

In one embodiment of the invention, the dielectric sheath with at least one gradation is formed with at least two different outer cross sections, with the dimension of the outer cross section being reduced toward the non-insulated end face. It is correspondingly possible to provide the recess of the dielectric with a corresponding gradation. In the interaction of the dielectric sheath with the recess, it is possible to ensure an improved and safer press fit of the sheath in the recess.

This purpose is also served by a design in which the inner cross section of the dielectric, relative to the outer cross section of the dielectric sheath that is assigned to it in the contact position, is at a sharp angle in axial direction of the contact pin, resulting in a funnel-like insertion of the sheath into the recess.

The inner cross section of the recess and the outer cross section of the sheath are circular in one embodiment, although other cross-sectional shapes, for example a square cross section, are likewise possible.

It may be appropriate for the invention when the electrode arrangement is in planar form and the electrodes in two-dimensional form therein are shielded from the surface to be treated by a planar layer of the dielectric. The shielding from the surface to be treated results from the fact that the dielectric forms a contact surface for contact with the surface to be treated but is preferably structured, in order to form air spaces for the formation of the plasma when the dielectric rests by its contact surface on the surface to be treated. The structuring of the surface may be formed in a manner known per se by pimples, a grid structure, recesses in the form of blind holes or the like.

Especially for treatment of curved or irregular surfaces, it is appropriate when the electrodes and the dielectric are flexible.

The lever arrangement by which the contact pressure of the contacting element on the contacting projection of the dielectric is brought about is appropriately lockable in the closed position. A useful lever arrangement is a lever arrangement known as a rocker switch. In order to increase the safety of the connection established between electrode arrangement and contacting element, the lever arrangement may have a two-arm lever with an axis of rotation and an actuation end on one side of the axis of rotation and a control end on the other side of the axis of rotation, wherein the control end is connected via a swivel joint in a swiveling manner to a wall section that opens and closes the receiving opening and is rotatably mounted on an axis of rotation, wherein the axis of rotation is closer to the receiving opening than the swivel joint. The lever arrangement thus constitutes a knee joint controller, by means of which the wall section can be opened wide to form the receiving opening and, when the receiving opening is closed, exerts a suitable contact pressure on the contacting projection of the dielectric when the contacting projection is correctly positioned in the receiving opening.

It may be appropriate to provide the contacting projection additionally with a mechanical positioning aid in the formed of a shaped-on pin or a shaped depression that interacts with a corresponding pin or a corresponding depression in the contacting element, and only enables the closing of the receiving opening to a possibly locked position of the lever arrangement when the positioning is correct. Correct positioning likewise requires engagement of the contact pin with its sheath into the corresponding recess in the dielectric into the press fit.

The moving wall section that forms the receiving opening may take the form of a hood that covers the contact pins in the closed state of the receiving opening. In one embodiment, this may have a surrounding wall, the circumferential margin of which, in the closed state of the receiving opening, ends parallel to a planar base of the receiving opening. The circumferential margin thus serves to clamp the contacting projection of the dielectric in the receiving opening, and the prestress of the wall section causes the flexible dielectric to be indented by the circumferential margin.

For increasing the safety of the connection between the contacting element and the contacting projection of the electrode arrangement that serves to transfer a high voltage, a first sensor may be provided for the closed position of the lever arrangement, which controls a switch for the stoppage of the feed for the high voltage to the electrodes. The supply of the electrode with high voltage is therefore possible only when the sensor has recognized a closed position of the lever arrangement.

In an analogous manner, a second sensor can detect complete introduction of the contacting projection into the receiving opening when the receiving opening is closed.

This ensures that the contacting element does not conduct any high voltage onto the contact pin when no electrode arrangement at all is connected to the contacting element.

Suitable sensors are, for example, light barriers that interact with corresponding projections on moving parts of the contacting element. For instance, a projection on the lever arrangement can project into an assigned light barrier in order to indicate the closed state of the lever arrangement by breaking of the light barrier. In a similar manner, the contacting projection inserted into the receiving opening, on closure of the receiving opening, can actuate a lever arrangement that has a projection that engages with a second light barrier and breaks the light barrier when the contacting projection is correctly positioned in the receiving opening. It will be appreciated that it is also possible to use light barriers in reverse function, in which the light barriers are not broken when the correct positioning of the contacting projection and/or the correct closure of the lever arrangement has taken place. In a skillful embodiment, the two light barriers may be arranged at a fork-shaped end of a light barrier body having three "prongs". The two interspaces formed can each be bridged by one of the light barriers. The projections on the moving parts of the contacting element can then, for the respective detection state, engage into a corresponding interspace between the prongs and hence break the respective light barrier, which is evaluated as the sensor signal.

The high-voltage AC signals that excite the plasma field are preferably pulse signals, the pulsewidth of which is significantly shorter than the interval to the next pulse. In practice, the excitation pulses appear as a damped vibration with significantly (for example exponentially) decreasing pulse amplitude, with the damped wave train thus formed likewise taking up only a portion of the interval to the next excitation pulse.

Since only a low current flows in the dielectric barrier plasma discharge, the contacting element can be designed as a standalone device with a battery voltage supply and a dedicated high-voltage generator stage. For the actuation of the two electrodes with antiphase high-voltage signals, for example in the form of vapor-deposited pulse trains, two high-voltage generator stages are required, each of which may have inductivity, for example. The inductivities may have opposite winding, which then results in the antiphase formation of the high-voltage signals.

It will be appreciated that it is also possible to supply the voltage supply cable to the contacting element. In this case too, it is possible to generate the high voltage in the contacting element, such that no transfer of the high voltage to the contacting element is required, but merely supply with a customary supply voltage that is not a high voltage.

Figure 2:
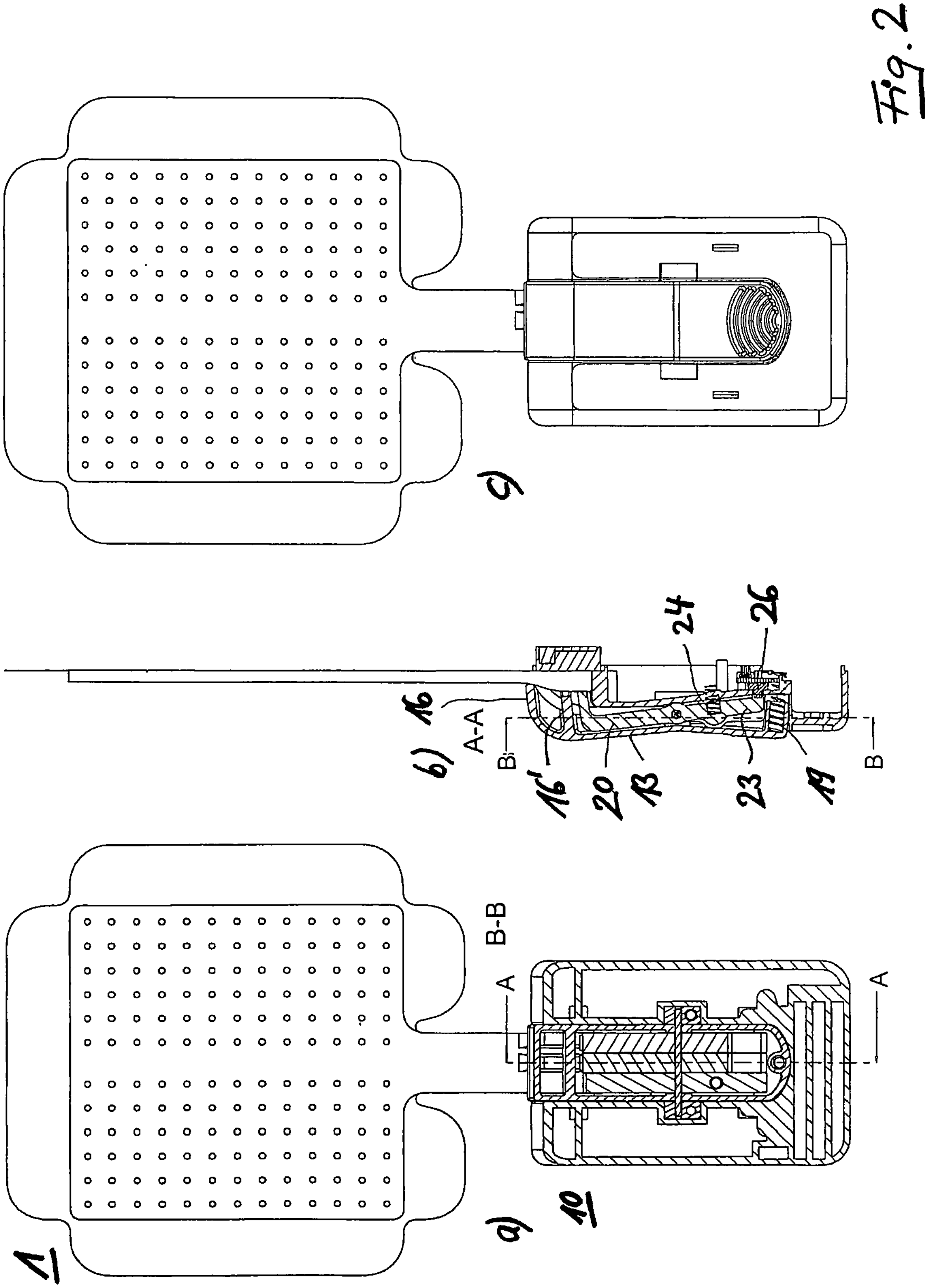
Figure 3:
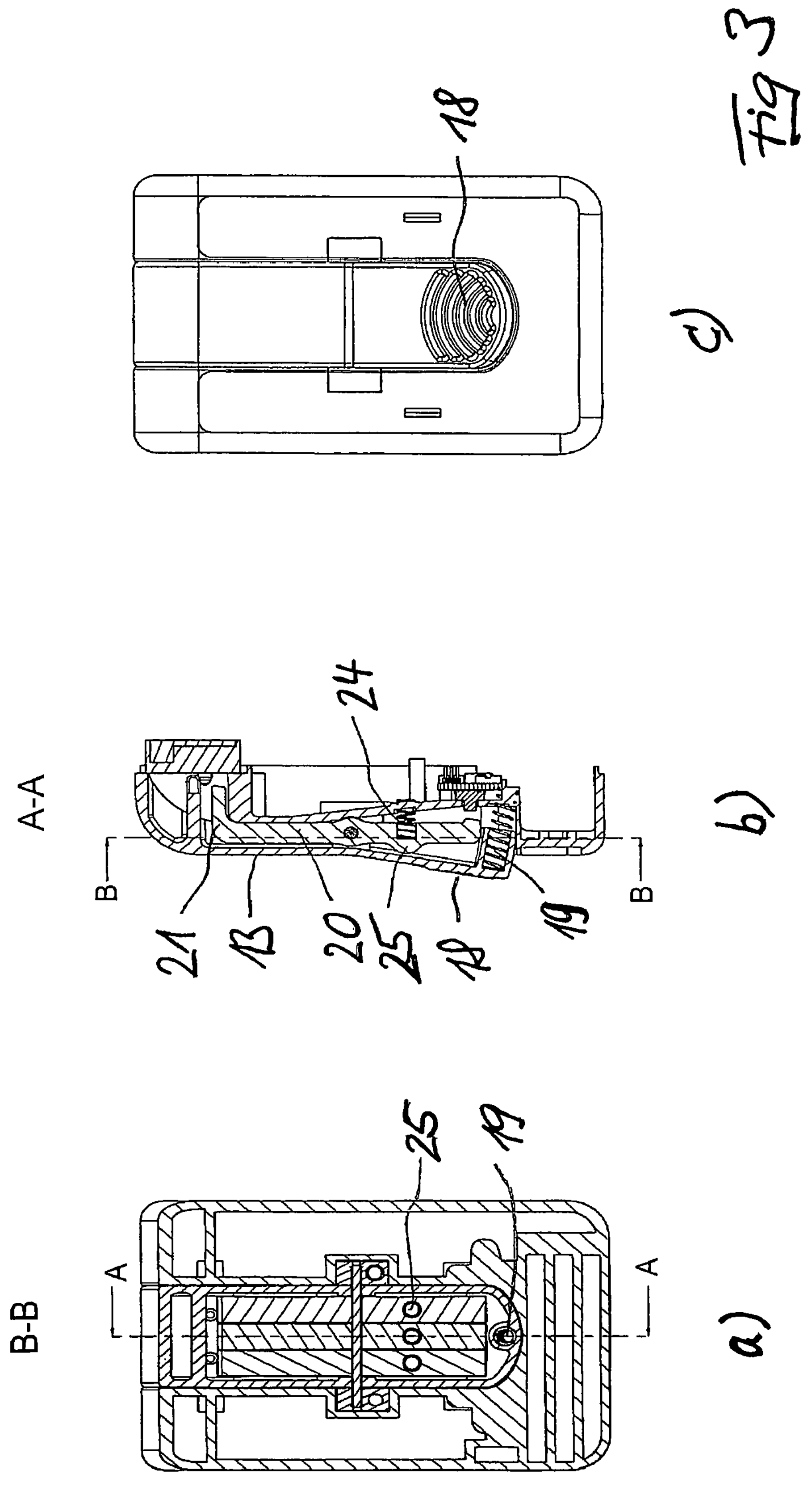
Figure 4:
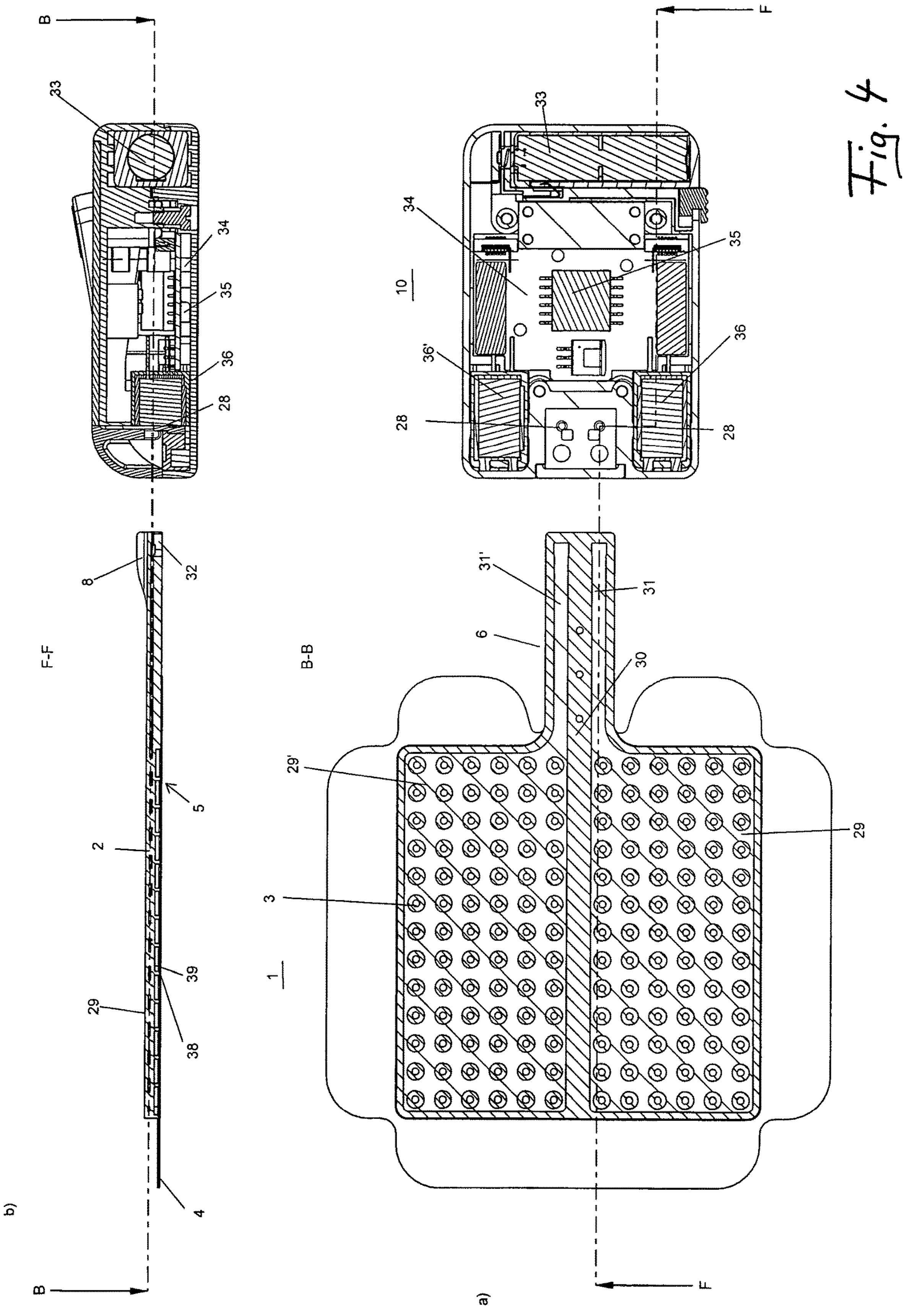
Figure 5:
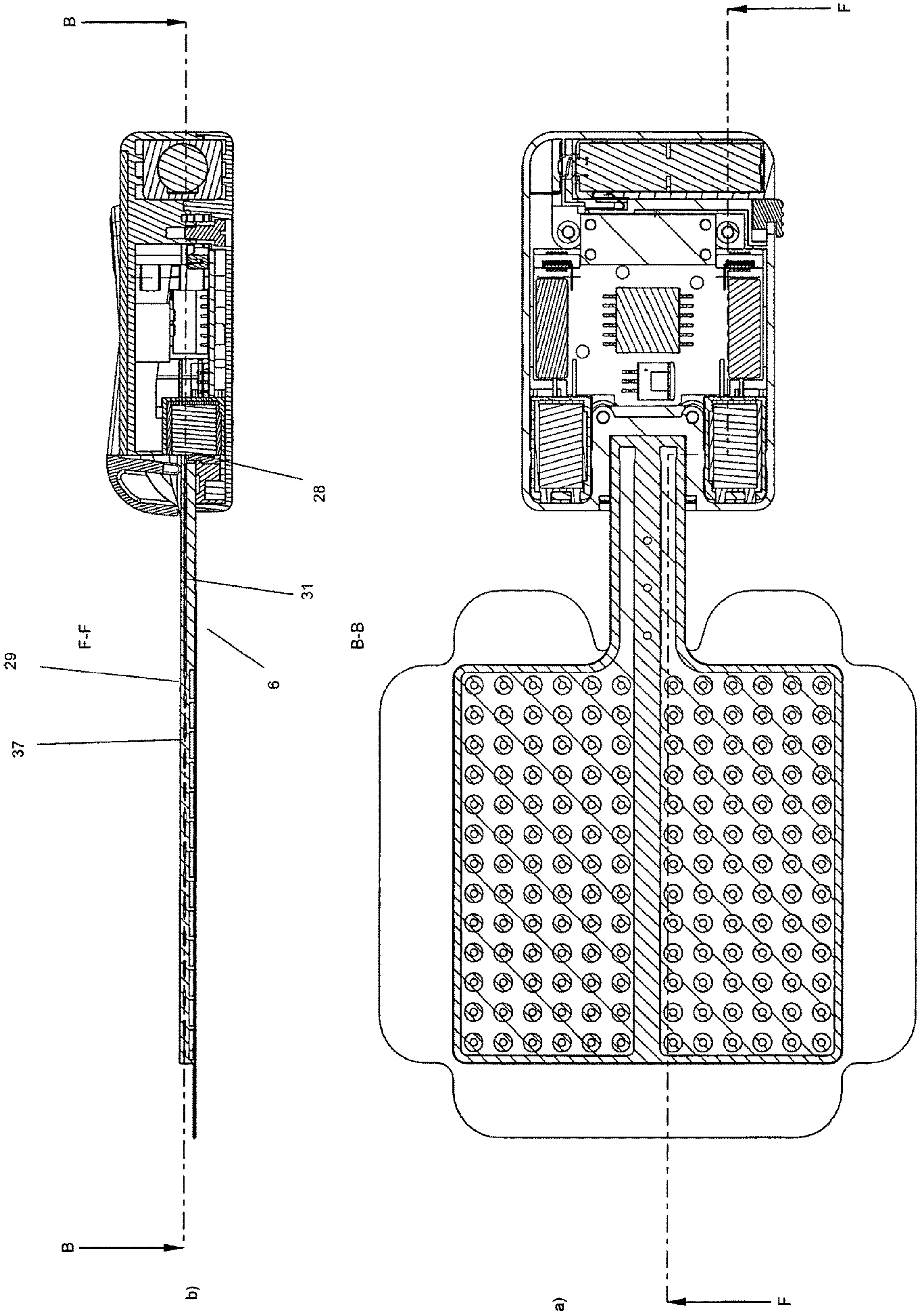
Figure 6:
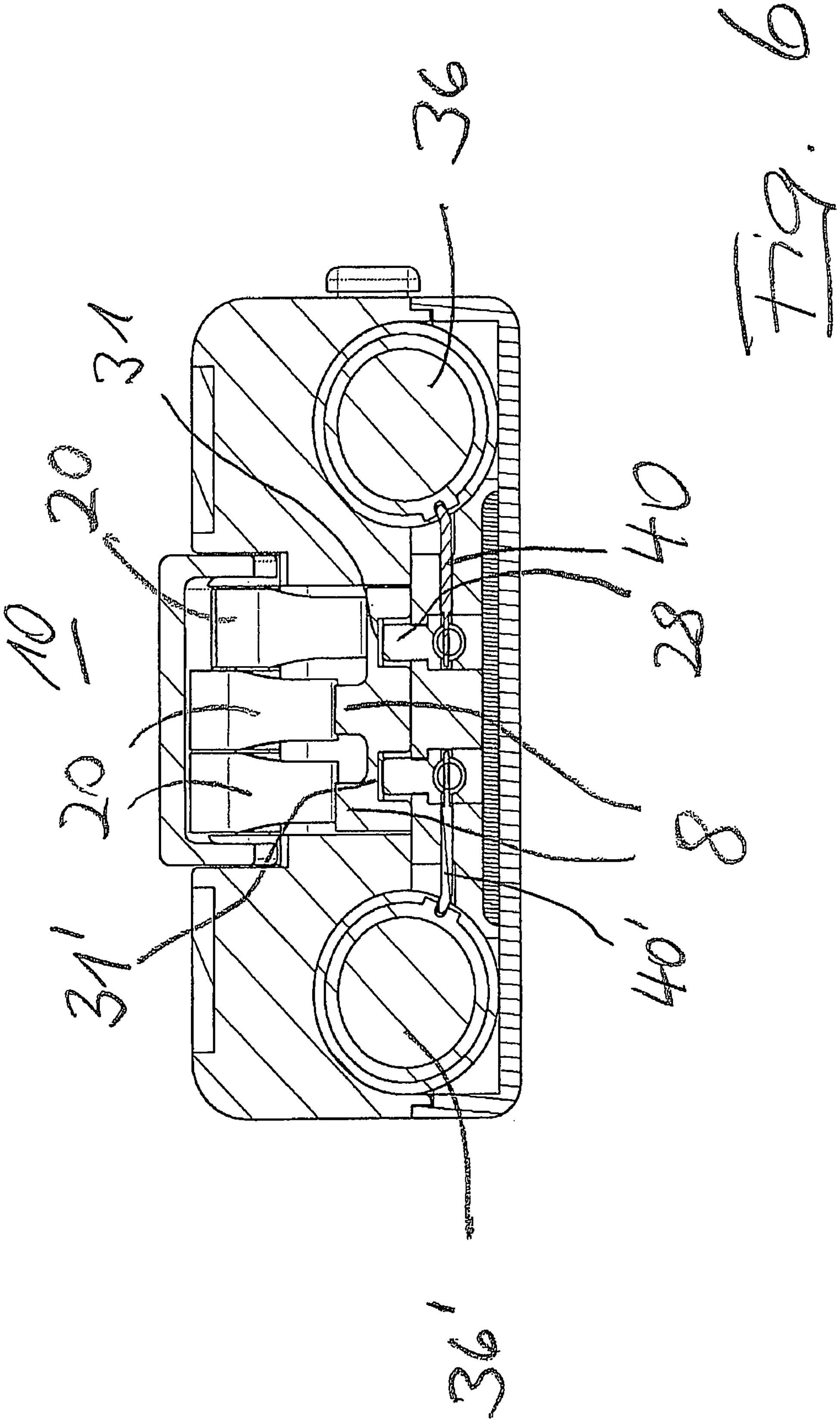
Figure 7:
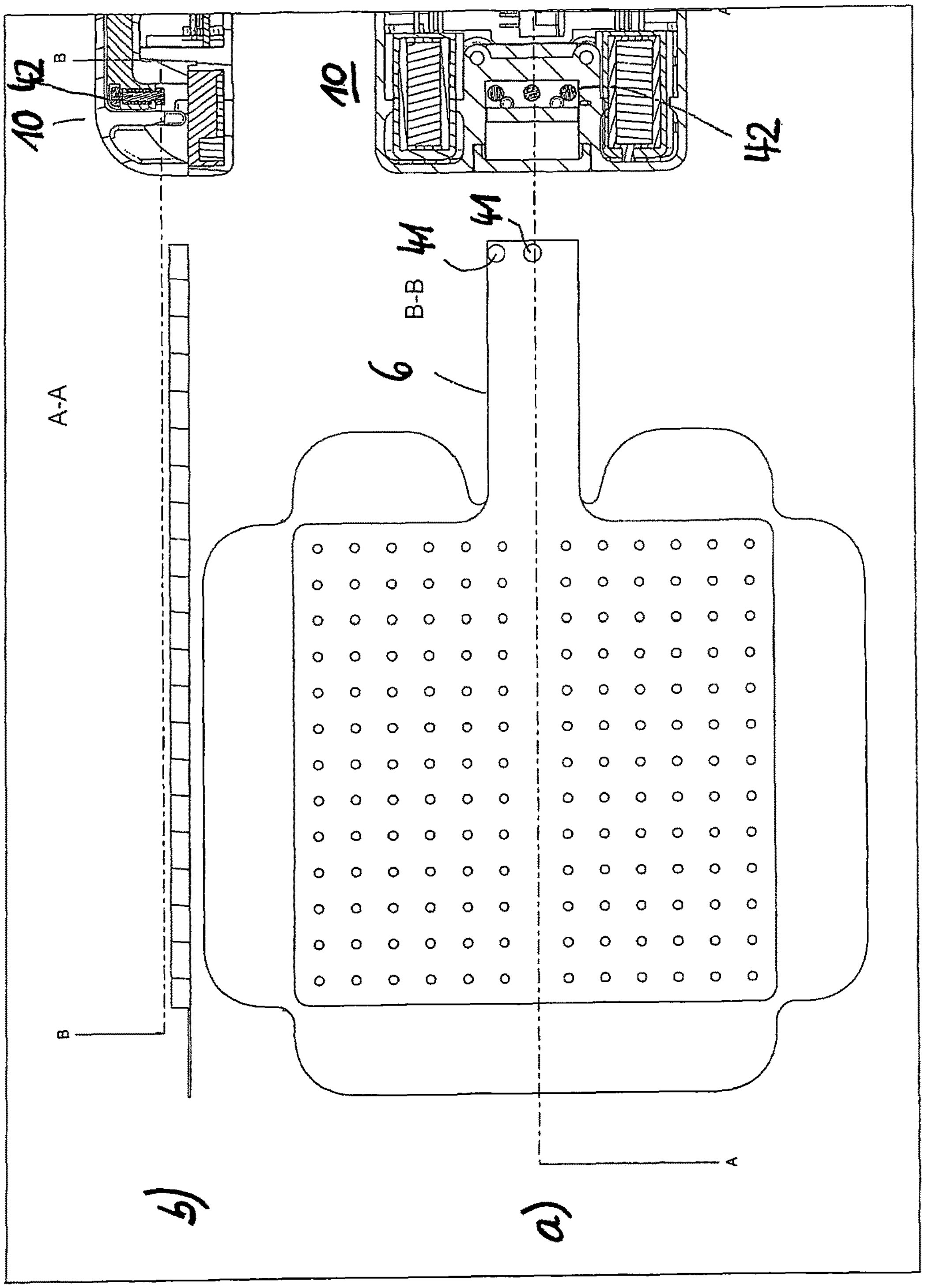
Figure 8:
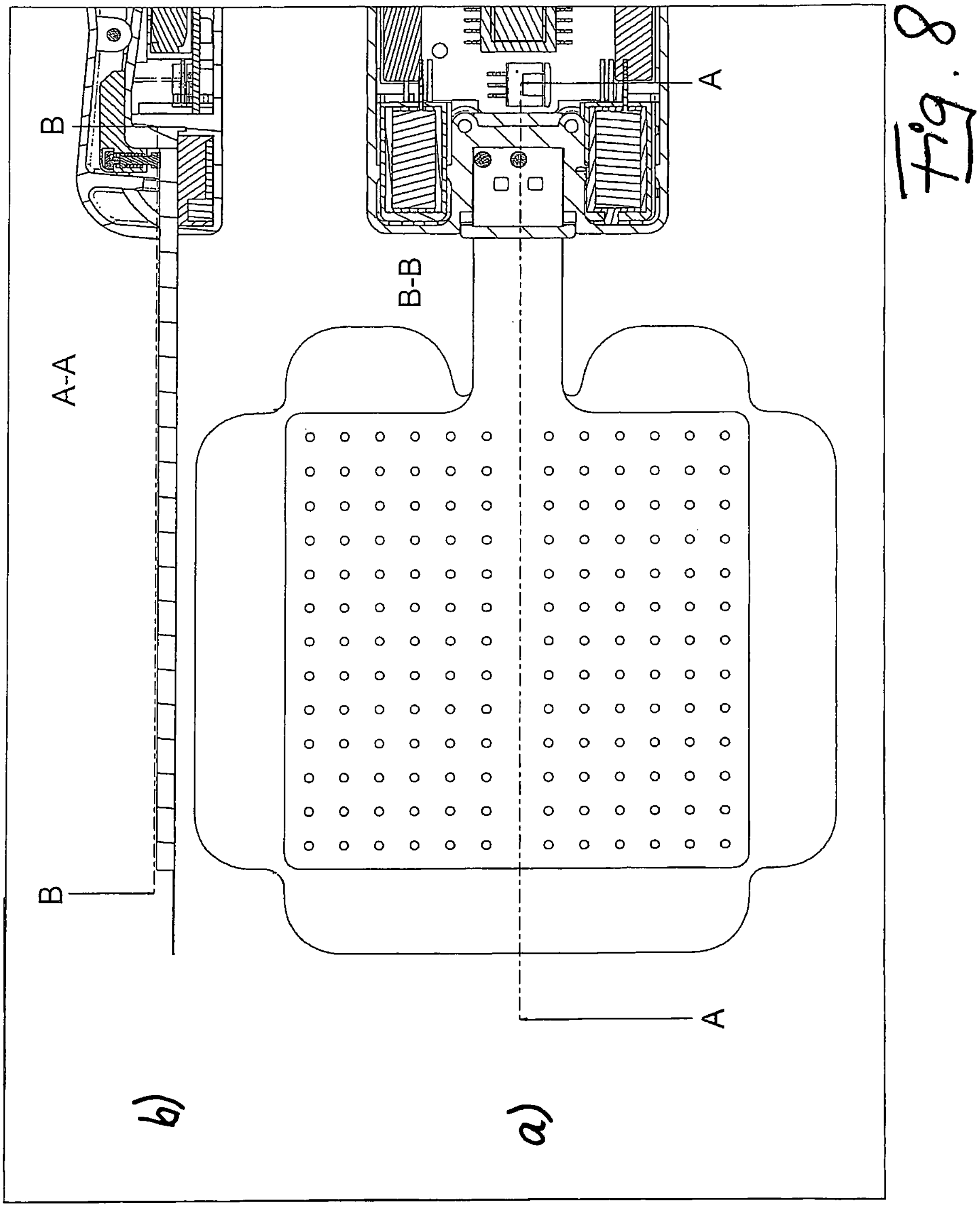
Figure 9:
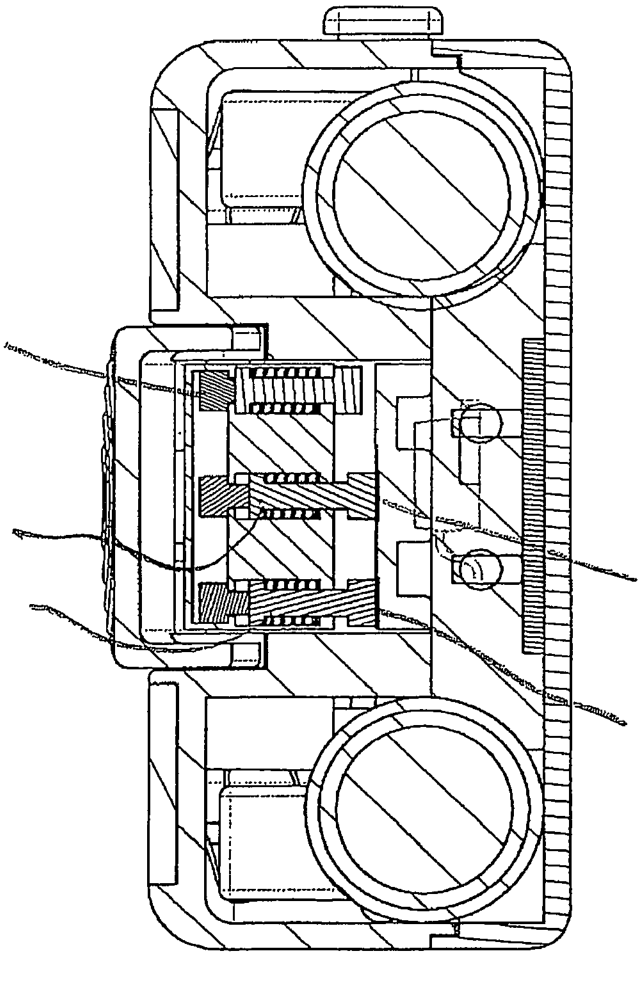
Figure 10:
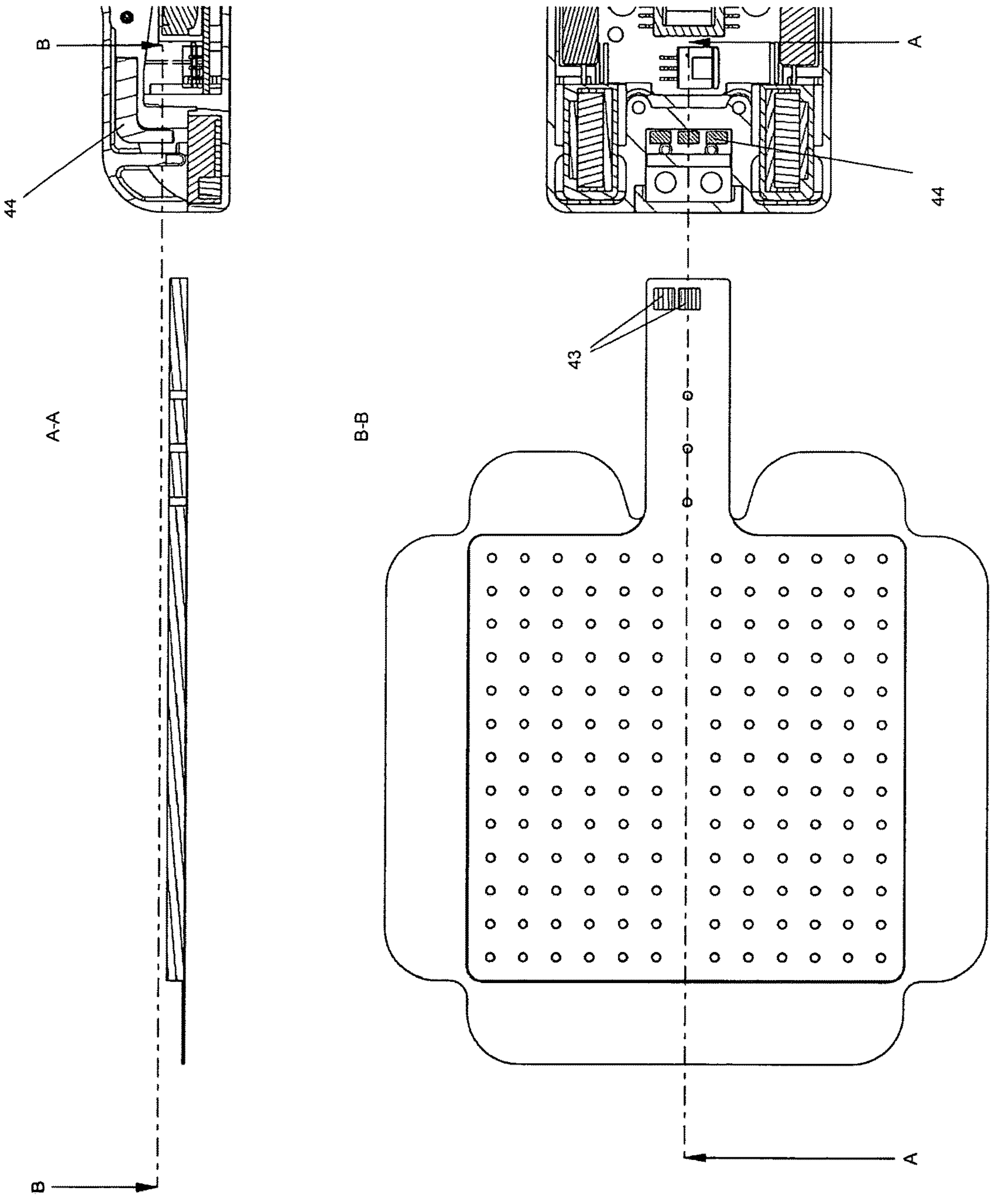
Figure 11:
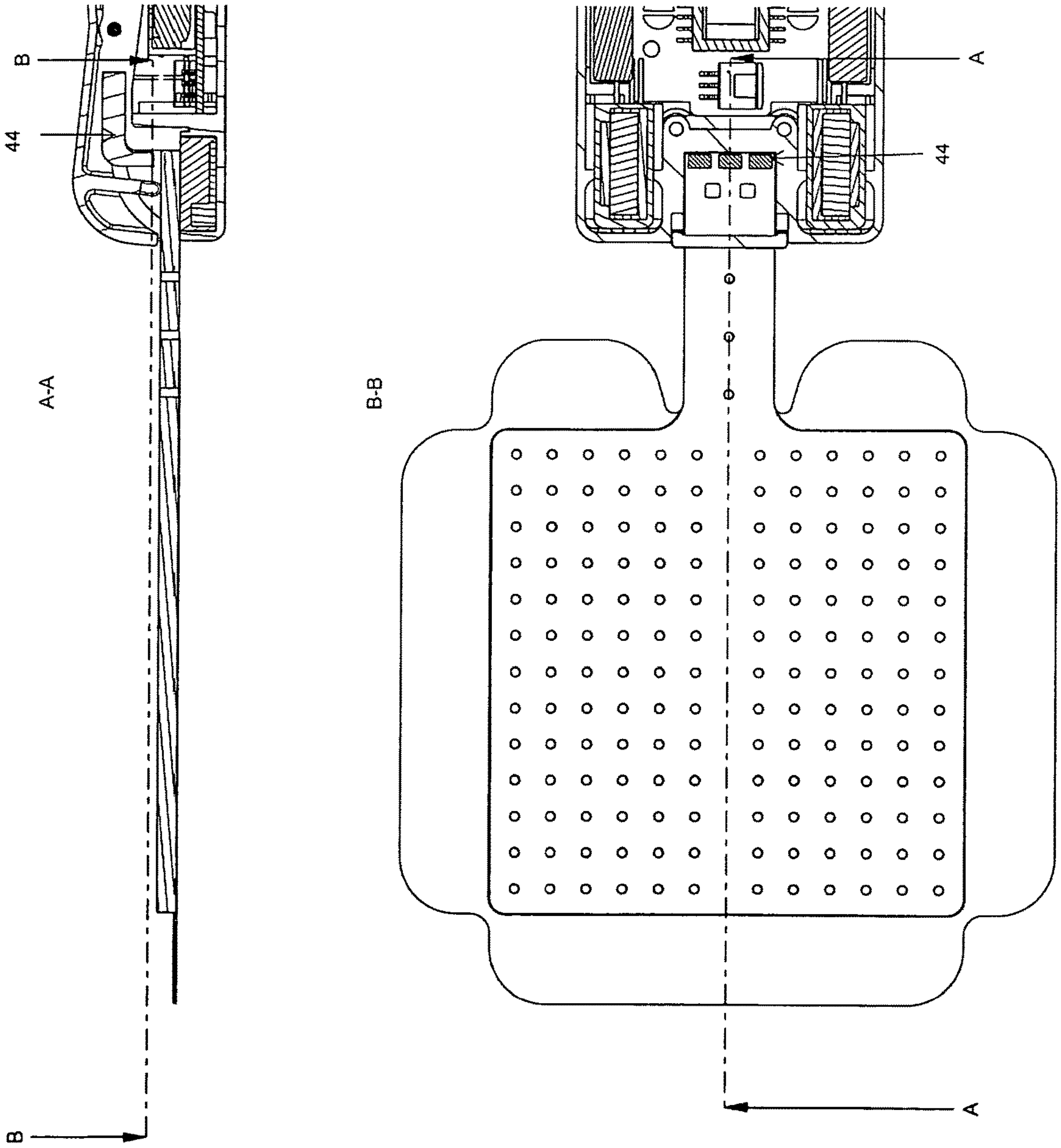

Alternatively, it is of course also possible to supply the contacting element with externally generated high-voltage signals. In this case, it is necessary to use high-voltage-safe cables and cable bushings. The invention is to be elucidated hereinafter by working examples shown in the drawing. The figures show:

FIG. 1—a top view of a treatment arrangement with a planar electrode arrangement and a contacting element in a first embodiment having an open receiving opening of the contacting element into which the electrode arrangement has not yet been inserted;

FIG. 2—a vertical section along the line A-A from FIG. 1;

FIG. 2*a*—an enlarged detail of FIG. 2;

FIG. 3—a top view as per FIG. 1 of the first embodiment with a receiving opening closed after the introduction of the electrode arrangement into the receiving opening;

FIG. 4—a vertical section along the line A-A in FIG. 3;

FIG. 4*a*—an enlarged detail from FIG. 4;

FIG. 5—a section illustration to illustrate the function of a first sensor in the open state of the receiving opening;

FIG. 5*a*—an enlarged illustration of detail C from FIG. 5:

FIG. 6—a section illustration according to FIG. 5 in the closed state of the receiving opening after the introduction of the electrode unit;

FIG. 6*a*—an enlarged illustration of detail C in FIG. 6:

FIG. 7—a cross section through the contacting element in the open state for elucidation of the function of two light barriers;

FIG. 7*a*—an enlarged illustration of detail D from FIG. 7;

FIG. 8—a cross-sectional illustration according to FIG. 7 in the closed state of the contacting element;

FIG. 8*a*—an enlarged illustration of detail E from FIG. 8;

FIG. 9—an enlarged detail of the contacting between contacting element and electrode arrangement in the closed state of the receiving opening;

FIG. 10—a top view of the contacting arrangement after removal of housing lid;

FIG. 11—a modification of the first embodiment by formation of the contacting element with a connection wire for a voltage supply;

FIG. 12—a top view of the arrangement according to FIG. 11;

FIG. 13—a top view of an electrode arrangement with a contacting element according to a second embodiment;

FIG. 14—a vertical section along the line A-A in FIG. 13 with open receiving opening;

FIG. 14*a*—an enlarged illustration of detail A from FIG. 14;

FIG. 15—a vertical section according to FIG. 14 with closed receiving opening along the line A-A in FIG. 13;

FIG. 15*a*—an enlarged illustration of detail A from FIG. 15;

FIG. 16—a vertical section through the arrangement according to FIG. 13 along the line B-B in FIG. 13.

The treatment arrangement of the invention consists of an electrode arrangement 1 and a contacting element 2.

FIGS. 1 to 7 show a first working example of a treatment arrangement of the invention, in which the contacting element is designed as a stand-alone device for complete supply of the electrode arrangement 1, as elucidated in detail below.

The electrode arrangement 1, in the working example shown, consists of two electrodes 1*a*, 1*b*, that have a planar design and are fully embedded into a dielectric 3. The dielectric 3 that essentially takes the form of a square area in a base section has thin application flaps 4 connected to it in one piece by which the electrode arrangement 1 can be bonded to an area to be treated, for example by adhesive bonding. In this way, the electrode arrangement is especially suitable as wound dressing.

The base section of the dielectric is adjoined, in the middle of one of its sides, by an elongated contacting projection 5 with a distinctly reduced width compared to the maximum width of the dielectric 3. In the contacting projection 5 that forms part of the dielectric 3 and is formed in one piece therewith, a terminal conductor 6*a*, 6*b* extends away from each of the two electrodes 1*a*, 1*b*, and these are connected in one piece to the corresponding electrode 1*a*, 1*b*. The electrodes 1*a*, 1*b* and the terminal conductors 6*a*, 6*b* are embedded on all sides into the dielectric 3 with its contacting projection 5, such that there is no possibility of contact with the electrodes 1*a*, 1*b* and the terminal conductors 6*a*, 6*b*. The dielectric 3 thus electrically shields all current-carrying parts of the electrodes 1*a*, 1*b* and their terminal conductors 6*a*, 6*b*, and prevents direct flow of current from the electrodes 1*a*, 1*b* to a counterelectrode outside the electrode arrangement 1. The two electrodes 1*a*, 1*b* and their terminal conductors 6*a*, 6*b* are in planar form and are insulated from one another along a middle axis 7 by material of the dielectric 3. The middle axis 7 in FIG. 1 runs along the section line E-E where it extends through the electrode arrangement 1.

In the region of the essentially square footprint of the dielectric 3, it is provided with numerous passage holes 8 that extend from a top side 9 of the dielectric 3 down to a bottom side 10 of the dielectric that forms a contact face for the surface to be treated. The passage holes 8 of the dielectric 3 are flush with passage holes 8' of the electrodes 1*a*, 1*b* that are larger than the passage holes 8, such that the electrodes 1*a*, 1*b* are also shielded by the dielectric 3 in the channels formed by the passage holes 8.

As indicated in FIG. 2, there are chambers 11 separated from one another by narrow lands 12 on the bottom side 10 of the dielectric 3. The lands 12 form a grid structure on the bottom side 10, in which the chambers 11 are in essentially square form. However, the shape and size of the chambers 11 can be chosen freely. They also need not be bounded by lands 12, but may also take the form of blind hole-like depressions in the material of the dielectric 3. It is also possible for air spaces for the plasma not to be bound laterally either, in that, for example, pimples protruding on the bottom side 10 of the dielectric are formed in one piece with the material of the dielectric 3.

The contacting projection 5 has, on its bottom side 10, a projection 13 in the form of a land that runs transverse to the middle axis 7, which, in the manner described below, serves for correct positioning of the electrode arrangement 1 in the contacting element 2.

FIG. 2 illustrates that the planar electrodes 1*a*, 1*b* are fully embedded in the material of the dielectric, but form, at their end in the contacting projection 5, a base of a recess 14 that is open toward the bottom side 10. Via the recess 14, it is possible for the corresponding electrode 1*a*, 1*b* to be fed with the high-voltage signals required for operation.

The contacting element 2 serves for the feeding of the high-voltage signals to the electrode arrangement 1. This has a housing with a lower housing section 16 and an upper housing section 17, which form an essentially closed housing 15 with a receiving opening 18. The receiving opening 18 is closable by a wall section 19 that is mounted in a swivelable manner on an axis 20 which is fixed with respect to the housing 15. Formed in the upper housing section 17 is a hollow 21 into which an actuating lever 22 can be swiveled when the actuating lever 22 closes the receiving opening 18 with the wall section 19. The wall section 19 forms a hood which, on its lower side, forms a margin 23 which is closed laterally and toward the electrode arrangement 1, and which, in the closed state of the wall section 19, is parallel to the planar contacting projection 5 of the electrode arrangement 1 in the contacting state of the electrode arrangement 1 with the contacting element 2. The wall section 19 in the form of a hood has a certain hood height, such that a further axis of rotation 24 is above the fixed axis 20. Above the axis of rotation 24, the wall section 19 is connected to an intermediate link 25 which is connected by a further swivel joint 26 firstly to a projection on the actuating lever 22 and secondly to a tension lever 27 which is in turn mounted by means of a swivel joint 28 which is fixed with respect to housing 15.

FIG. 2 shows the actuation arrangement for the wall section 19 in the open state. FIG. 2*a* is an enlarged diagram of detail B in FIG. 2.

FIG. 2 illustrates that the receiving opening 18 is bounded in the downward direction by an essentially flat base 29, from which a contact pin 31 ensheathed with a dielectric sheath 30 projects upward. The shaping of the dielectric sheath 30 corresponds to the shaping of the recess 14 in the contacting projection 5 of the electrode arrangement 1. In the base, there is also a transverse groove 32, the shape of which corresponds to the shape of the projection 13 in the form of a land on the bottom side 10 of the contacting projection 5. When the projection 13 in the form of a land projects into the transverse groove 32, the electrode arrangement 1 is contacted correctly relative to the contacting element 2, and the dielectric sheath 30 of the contact pin 31 can engage into the recess 14 when the wall section 19 is closed and the lower margin 23 of the wall section 19 presses with prestress against the material of the dielectric 3.

Also present in the contacting element 2 is a light barrier holder 33 in which two light barriers are arranged successively between two outer walls and one intermediate wall, which each form one gap that can be bridged by one light barrier. For the interaction with one of the light barriers, the tension lever 27 is provided with a protruding projection 34 in one-piece form. For the interaction with the other light barrier, a two-arm lever 35 is mounted on a fixed rotation axis 36, one lever arm 37 of which projects into the receiving opening 18, while the other lever arm can project into the region of the second light barrier by a free end.

Also apparent schematically from FIG. 2, in the contacting element 2, is an electrical controller 39 that supplies the contact pin 31 with high-voltage signals and the light barriers in the light barrier holder 33 with a suitable operating voltage.

FIGS. 3, 4 and 4*a* show the arrangement according to FIGS. 1 and 2 in the inserted state of the electrode arrangement 1 into the contacting element 2 and in the state of the receiving opening 18 closed by the wall section 19, into which the contacting projection 5 of the electrode arrangement 1 projects.

Comparison of the enlarged diagrams of FIGS. 2*a* and 4*a* illustrates that the tension lever 27, on closure of the actuating lever 22, is pivoted such that its projection 34 projects from a starting position in FIG. 2*a* into a light barrier gap of the light barrier holder 33. The breaking of this light barrier by the projection 34 thus suggests a correct locking state of the actuating lever 22—and hence of the actuating arrangement for the wall section 19 that closes the receiving opening 18.

In a similar manner, FIGS. 5, 5*a* on the one hand and FIGS. 6, 6*a* on the other hand illustrate a second detection option for the correct insertion of the contacting projection 5 of the electrode arrangement 1 into the receiving opening 18 of the contacting element 2. This purpose is served by the two-arm lever 35, which is pushed into a starting position by means of two compression springs 40 that proceed from the lever arm 37 projecting into the receiving opening 18; in said starting position, the second lever arm 38 projects into the region of a second light barrier of the light barrier holder 33 with an offset end 41.

If the electrode arrangement 1 is inserted correctly into the receiving opening 18 of the contacting element 2 and the receiving opening 18 is closed correctly by the wall section 19, as illustrated in FIGS. 6 and 6*a*, the margin 23 of the wall section 19 presses the contacting projection 5 downward against an end of the lever arm 37, which is pushed thereby into a recess envisaged therefor in the base 29, as a result of which the offset end 41 of the other lever arm 38 is pivoted upward out of the region of the light barrier in question.

The switching states for the two light barriers are shown in a cross section in FIGS. 7, 7*a* and 8, 8*a*. Especially the enlarged diagrams in FIGS. 7*a* and 8*a* show the light barrier holder 33. Between two wall sections 43 that form a gap 42 that is open on one side, a first light barrier 44 is apparent, represented by a light beam. In a corresponding manner, parallel wall sections 43' form a gap 42' that is open on one side, in which a second light barrier 45 is formed. The first light barrier interacts with the projection 34 of the tension lever 27, and the second light barrier with the offset end 41 of the lever arm 38. FIGS. 7 and 7*a* illustrate that, in the open state of the actuating lever 22—and hence in the open state of the receiving opening 18—the first light barrier 44 indicates reception of the emitted light beam—i.e. no breaking of the light beam—while the light beam from the second light barrier 45 is broken by the offset end 41 of the lever arm 38 of the two-arm lever 35.

FIG. 8*a* shows the light barriers in the closed state of the actuating lever 22 when the contacting projection 5 of the electrode arrangement 1 has been introduced correctly into the receiving opening 18. In this case, the offset end 41 is raised somewhat in the gap 42', such that the second light barrier 45 is cleared, while the projection 34 of the tension lever 27 now breaks the light beam of the first light barrier.

FIG. 9 illustrates, in an enlarged detail illustration, the contacting of the electrodes 1*a*, 1*b* with the high-voltage via the contact pin 31 in the contacting element 2. The contacting projection 5 of the electrode arrangement 1 inserted correctly into the contacting element 2 engages by the projection 13 in the form of a land into the corresponding transverse groove 32 in the base 29 of the receiving opening 18. In the same way, the recess 14 on the bottom side 10 of the dielectric 3 is pushed into the correspondingly shaped dielectric sheath 30 of the contact pin 31. The dielectric sheath 30 surrounds the contact pin 31 completely toward the dielectric 3 of the electrode arrangement 1, except for an end face 46 of the contact pin 31 that is not insulated. The contact pin 31 consists of a solid conductive material, especially metal. The electrode 1*a*, 1*b* consisting of a conductive material that is fully embedded into the dielectric 3 of the electrode arrangement 1 except for the recess 14 is pushed by the prestress exerted by the wall section 19 against the non-insulated end face 46 of the contact pin 31, which establishes a contact suitable for the introduction of the high-voltage signals into the electrode 1*a*, 1*b*.

The dielectric sheath 30 is produced slightly oversized with respect to the recess 14 shaped in the same way, such that the contact pressure of the wall section 19 causes the dielectric sheath 30 to enter into a press fit in the recess 14. To facilitate the introduction of the dielectric sheath 30 in the press fit of the recess 14, dielectric sheath and recess 14 may be in slightly conical form, so as to result in a funnel-like introduction of the dielectric sheath 30 into the recess 14. In the embodiment shown, the introduction is facilitated in that the dielectric sheath 30 narrows in a stepwise manner towards the end face 46 of the contact pin 31, so as to result in two sections of roughly equal length with outer cross sections that differ in steps. The outer cross section is preferably circular.

The press fit of the dielectric sheath 30 in the recess 14 effectively prevents the formation of an air gap at the transition between dielectric 3 and dielectric sheath 30, since the dielectric 3 and the dielectric sheath 30 are formed with sufficient elasticity. The formation of an air gap directed in longitudinal direction of the contact pin 31 can be even more reliably prevented when the wall of the recess 14 or of the dielectric sheath 30 is provided with fine grooves that run in circumferential direction, as indicated in FIG. 9. By virtue of the thin lips that result between the grooves, not only is the introduction of the dielectric sheath 30 into the press fit in the recess 14 facilitated, but it is also ensured with certainty that no continuous air gap can form in longitudinal direction of the dielectric sheath.

The electrode arrangement 1 with the dielectric 3 and the electrodes 1*a*, 1*b* is preferably flexible. The electrodes 1*a*, 1*b* may be formed by a thin metal foil, but may especially also consist of a synthetic polymer that has been rendered conductive by suitable additives. In this way, dielectric and electrode may consist of related materials that can be efficiently bonded facially to one another, such that the risk of delamination within the electrode arrangement is avoided even when the electrode arrangement is bent to a greater or lesser degree in use.

FIG. 10 illustrates, in a top view of the housing 15 of the contacting element 2 with the upper housing section 17 removed, that a controller 39 is disposed in the housing, comprising a microcontroller 47, a high-voltage generator stage 48 and an accumulator stage 49. In this way, the contacting element 2 is designed as a complete control and supply unit for the electrode arrangement 1 for production of a dielectric barrier plasma.

By contrast, FIGS. 11 and 12 show a contacting element that contains the controller 39, but not the accumulator stage 49, because, in this case, the contacting element 2 is connected via a cable connection 50 to an external power supply 51. For avoidance of high-voltage-safe connections, it is also possible in this case for the controller 39 to include the high-voltage generator stage 48, such that a normal AC voltage or else a low DC voltage can be supplied via the external power supply.

FIGS. 13 to 16 show a second working example of the invention. It differs from the first embodiment exclusively in the different design of the contacting element 2' with which the same electrode arrangement 1 can be contacted.

The contacting element 2' in this embodiment is designed with an actuating lever 52 in the form of a rocker 54 which is pivotable about a fixed axis of rotation 53 and which has, at one end, the wall section 19 in the form of the hood described, shaped in the same way for contact pressure of the contacting projection 5 of the electrode arrangement 1, while, at the other end of the rocker 54, there is an effective locking button 55, which is elucidated hereinafter. The locking button 55 is mounted in a sliding manner on the lever 56 that is remote from the electrode on the rocker 54, and is under prestress by two compression springs 57 that pushes the locking button away from the lever 56. The lever 58 close to the electrode, which forms the wall section 19, is held by a pair of compression springs 66 supported against the housing 15' of the contacting element 2' (FIG. 16) in the open position of the receiving opening 18' shown in FIG. 14. After the introduction and correct positioning of the contacting projection 5 of the electrode arrangement 1, a force directed toward the base 29' of the receiving opening 18' is exerted on the wall section 19, which is indicated in FIGS. 15 and 16 by an arrow P. As a result, the end of the lever 56 remote from the electrode on the rocker 54 that has been provided with the locking button is pushed upward, such that a projection 59 directed backward that is present at the lower end of the locking button 55 moves in front of a suitable recess 60 in the housing 15', into which it is pushed in a snap-fitting manner by the compression springs 57, in order thus to lock the closed state of the receiving opening 19.

For unlocking, i.e. for opening of the receiving opening 19, for example for the purpose of withdrawing the electrode arrangement 1, the locking button 55 has to be pressed in the direction of electrode arrangement 1 against the force of the compression springs 57. In order to facilitate this, there is a suitable corrugation 61 on the top side of the locking button 55, which makes it difficult for an actuating finger to slip off the locking button.

All other parts of the contacting element 2' correspond to the corresponding parts of the first embodiment, and are therefore not described here again.

FIG. 13 illustrates, in the top view of the contacting element 2', that it—like the contacting element 2 of the first embodiment—can be provided with actuating buttons 62/63 for the electronic functions (on/off; high voltage on/off) and with display light sources 64, 65 as control lights for the sensor states ascertained (lever locked, contacting projection 5 correctly inserted into the receiving opening 18,18'). In addition, a corrugation 61' for the exertion of pressure may also be provided on the lever 58 close to the electrode.

The second working example described in FIGS. 13 to 16 is of simpler construction, whereas the first working example is more user-friendly. The increase in user-friendliness arises from the fact that the receiving opening 18 can be made larger on account of the lever transmission, which facilitates the correct insertion of the electrode arrangement 1 into the contacting element 2. Furthermore, the lever transmission for the actuating lever ensures easier exertion of the contact pressure force in the locked state of the lever arrangement.

The invention claimed is:

1. A treatment arrangement for the treatment of a surface of a body with a dielectric barrier plasma, comprising:

an electrode arrangement in which at least two electrodes are disposed in a base section of the electrode arrangement, wherein the electrode arrangement is fully shielded with respect to a surface to be treated by a dielectric, and wherein the electrode arrangement extends by a terminal conductor into a contacting projection of the dielectric;

a contacting element comprising a receiving opening for the contacting projection;

an AC high-voltage source;

a lever arrangement for opening and closing the receiving opening and for applying contact pressure on a contact pin through a prefabricated recess in the dielectric onto at least one electrode of the at least two electrodes for guiding a terminal of the AC high-voltage source onto the at least one electrode;

wherein the at least two electrodes that are disposed in the base section are isolated from one another by the dielectric, the at least one electrode of the at least two electrodes is supplied with high-voltage from the AC high-voltage source for generation of the dielectric barrier plasma, and each of the at least two electrodes extend by a terminal conductor into the contacting projection;

wherein there is one recess in the dielectric and one contact pin in the contact element for each terminal conductor;

wherein the at least two electrodes are enabled for generating the dielectric barrier plasma when energized with AC high-voltage from the AC high-voltage source;

wherein at least one of the contact pins in the contacting element is surrounded with a dielectric sheath and comprises a non-insulated end for establishing contact with the corresponding electrode of the at least two electrodes; and wherein the at least one dielectric sheath is oversized with respect to the corresponding recess in the dielectric in a radial direction, and wherein the at least one dielectric sheath, by means of the lever arrangement, is press-fitted into the dielectric so as to avoid an air gap when the non-insulated end of the contact pin contacts the corresponding electrode and a sparkover or flashover between the contact pins of the terminal conductors in the contacting projection is avoided.

2. The treatment arrangement as claimed in claim 1, wherein the at least one dielectric sheath has at least one gradation wherein two outer cross sections adjoin one another in a stepped manner, with a reduced outer cross section of the two outer cross sections being toward the non-insulated end of the contact pin.

3. The treatment arrangement as claimed in claim 2, wherein the recess in the dielectric is gradated in an inner cross section so as to correspond to the at least one gradation of the dielectric sheath.

4. The treatment arrangement as claimed in claim 1 wherein at least one inner cross section of the dielectric and/or an outer cross section of the dielectric sheath narrows conically toward the non-insulated end of the contact pin.

5. The treatment arrangement as claimed in claim 1 wherein the electrode arrangement is in planar form, wherein the electrodes are in planar form and are shielded from the surface to be treated by a planar layer of the dielectric.

6. The treatment arrangement as claimed in claim 1 wherein the at least two electrodes and the dielectric are flexible.

7. The treatment arrangement as claimed in claim 1 wherein the lever arrangement has a two-armed actuation lever comprising an actuation end on one side and a control end on a second side, wherein the control end is connected via a swivel joint in a swiveling manner to a wall section that opens and closes a receiving opening, is rotatably mounted on an axis of rotation, and is rotatably connected to the control end via an intermediate link.

8. The treatment arrangement as claimed in claim 7 wherein the wall section takes the form of a hood that covers the contact pins in the closed state of the receiving opening.

9. The treatment arrangement as claimed in claim 8, wherein the hood has a margin that seals off the wall section and, in a closed state of the receiving opening, ends parallel to a planar base of the receiving opening.

10. The treatment arrangement as claimed in claim 9, wherein the dielectric of the contacting projection, in the closed state of the receiving opening, is clamped under prestress between the margin of the hood and the planar base.

11. The treatment arrangement as claimed in claim 1 further comprising a first sensor for sensing a closed position of the lever arrangement; and a switch controlled by the first sensor for stoppage of feeding of high voltage to at least one electrode of the at least two electrodes.

12. The treatment arrangement as claimed in claim 1 further comprising a sensor that detects complete introduction of the contacting projection into a receiving opening after closure of the receiving opening.

* * * * *